United States Patent [19]
Cole

[11] Patent Number: 5,984,121
[45] Date of Patent: Nov. 16, 1999

[54] UNIVERSAL ADJUSTABLE PALLET RACK SAFETY SYSTEM AND OFFSET BRACKET ASSEMBLY

[75] Inventor: Barry A. Cole, Thornton, Colo.

[73] Assignee: Carron Net Company, Inc., Two Rivers, Wis.

[21] Appl. No.: 08/831,860

[22] Filed: Apr. 2, 1997

Related U.S. Application Data

[60] Provisional application No. 60/015,139, Apr. 5, 1996.

[51] Int. Cl.[6] .................................................. A47F 5/00
[52] U.S. Cl. .......................................................... 211/183
[58] Field of Search ..................................... 211/180, 189, 211/191, 183

[56] References Cited

U.S. PATENT DOCUMENTS

| | | | |
|---|---|---|---|
| 4,334,621 | 6/1982 | Weber | 211/89 |
| 4,335,165 | 6/1982 | Powers | 428/8 |
| 5,170,829 | 12/1992 | Duncan et al. | 211/191 |
| 5,269,736 | 12/1993 | Roberts | 482/62 |
| 5,316,315 | 5/1994 | Roark, Jr. | 273/411 |
| 5,573,125 | 11/1996 | Denny | 211/183 |

*Primary Examiner*—Daniel P. Stodola
*Assistant Examiner*—Erica B. Harris
*Attorney, Agent, or Firm*—Whyte Hirschboeck Dudek SC; Michael J. Gratz, Esq.

[57] ABSTRACT

A safety system allows a safety guard, e.g. a net and at least one cable, that can be attached in an offset relationship to the back of a pallet rack so that all of the net-supporting cables are in the same plane and that the spacial distance between the safety net and the back of the pallet rack can be adjusted without disengaging the net-supporting cables from a pallet rack member, such as, an extension boom or offset bar. The system may use an offset bracket assembly comprising: an offset bar of a linear length and having a first end and a second end, the bar having at least one set of apertures positioned along the linear length of the bar, a mounting plate attached to the first end of the offset bar and adapted to securely engage a support post of the pallet rack, the mounting plate attached to the offset bar such that its plane is perpendicular to the central axis of the offset bar, and a mounting sleeve of a linear length and adapted to be slidably received by the offset bar, the mounting sleeve having at least one aperture that can be aligned with at least one aperture of the offset bar and having at least one eyelet securely attached to an external surface and configured to engage a net supporting cable. A similar mounting sleeve or attachment sleeve may be used to adjustably attach a support system to the pallet rack and a vertical extension boom.

21 Claims, 5 Drawing Sheets

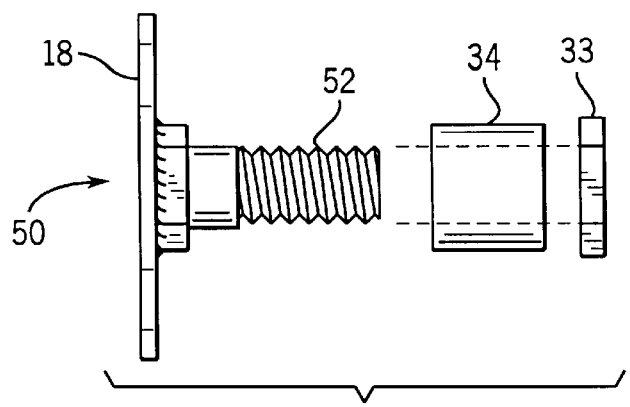
FIG. 7
FIG. 8
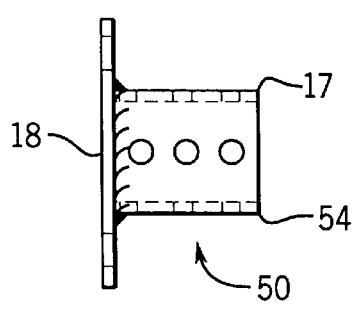
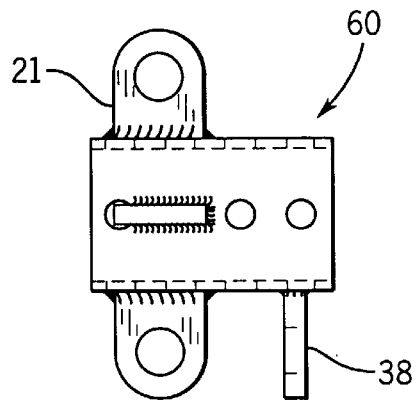
FIG. 10
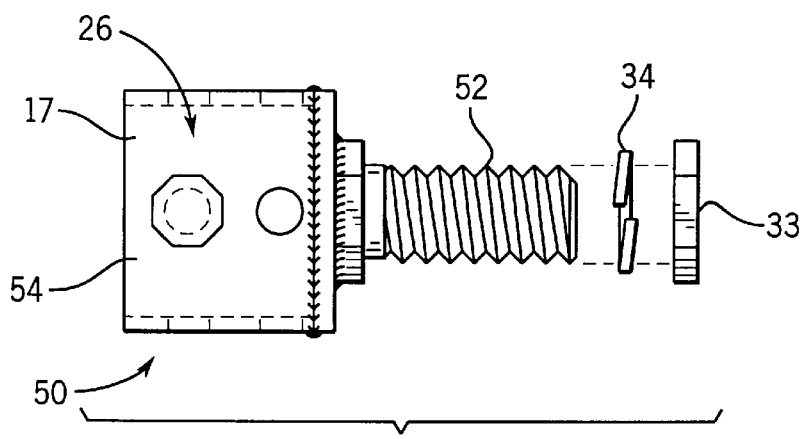
FIG. 9

UNIVERSAL ADJUSTABLE PALLET RACK SAFETY SYSTEM AND OFFSET BRACKET ASSEMBLY

CROSS REFERENCE TO RELATED APPLICATIONS

This application claims the benefit of provisional application, application Ser. No. 60/015,139 filed Apr. 5, 1996.

FIELD OF THE INVENTION

This invention relates to a pallet rack safety system. In one aspect, the invention relates to a pallet rack equipped with an adjustable safety system while in another aspect, the invention relates to the hardware components of the safety system. In yet another aspect, the invention relates to the offset, extension boom, and support members of such a system.

BACKGROUND OF THE INVENTION

As described in U.S. Pat. No. 4,981,225, pallet racks are commonly employed in large warehousing storage and distribution facilities, and the cells hold one or more pallets that are positioned through the use of forklifts or other similar vehicles. These vehicles load the pallet rack from its front side but frequently the design of the pallet rack and the positioning of one pallet rack relative to another is such that the operator of the forklift cannot see the back edge of a particular pallet rack cell. This, on occasion, can result in goods falling off the back side of the pallet rack including those goods on the pallet being placed on or removed from the rack, or goods on pallets already in the cell. In some instances, entire pallets can fall. Accordingly, safety guards, e.g. nets, cables, chain links, plastic webbing, tarpaulins, metal sheeting, etc., attached to the backside are desirable.

One of the earlier patents of the inventor, U.S. Pat. No. 4,981,225 which is incorporated herein by reference, describes a universal safety net system which is especially adapted for installation in connection with a wide range of pallet rack shapes, size and load requirements. The safety net system of that patent includes at least two extension assemblies for extending the effective vertical height of rear support posts of the pallet rack, each assembly including a tube and a pair of mounting plates fixed to one side of the tube. The safety net system also includes an extension boom with an extension end, the boom slidably received in the tube and longitudinally positionable at a plurality of locations. Bolts are inserted through openings in the boom and tube for fixing the length of the extension assembly, and cables are suspended between the booms.

The safety net system of U.S. Pat. No. 4,981,225 also includes offset members that can be mounted to the booms to horizontally extend the net off the back of the pallet rack. These offset members are described as square steel tubes with opposing sides having aligned equidistantly spaced perforated apertures. Welded to one end of the tube is a rectangular mounting plate, the plane of which is perpendicular to the central axis of the tube. The mounting plate has four corner openings spaced from the plate/tube intersection, and these openings are adapted to receive U-bolts by which the offset member is mounted to a support post of the pallet rack. Upon mounting, the offset member extends transversely from the pallet rack in a generally horizontal orientation.

Apertures in the steel tubes define a multiplicity of offset locations by which the safety net can be spaced from the pallet rack. Eye bolts are inserted through selective pairs of apertures such that suspension and/or support cables can be attached to the eye of the bolt and from these cables, the safety net can be attached.

While the offset members in combination with the eye bolts provide a useful system for supporting a safety net in an offset relationship from the pallet rack, this system is not without room for improvement. For example, for those offset members to which more than one net-supporting cable is attached, the use of two or more eye bolts is required. However, because each eye bolt must occupy a separate pair of aligned apertures on the square steel tube, each cable is in a different plane from the other cables. This may cause problems with the ability to maximize the tension of the net. Moreover, these eye bolts with their attendant nuts and washers can represent literally hundreds of small parts (per pallet rack) which are prone to misplacement by installers or those responsible for adjusting the net after it has been installed. Further, such installation is very labor intensive.

Another drawback to the offset member described in U.S. Pat. No. 4,981,225 is that to change the spacial distance between the safety net and the back of the pallet rack or raise or lower the top of the net on the extendable boom, requires the disengagement or loosening of the cable from the eye bolt, removal and then repositioning the eye bolt on the square steel tube, and then refastening and retightening (or retensioning) the cable to the eye bolt. Complicating this procedure even more is that often it must be preformed "in the air" (e.g. many feet above floor level) and depending upon the nature and size of the net, the net must be completely removed due to its weight (which can literally be hundreds of pounds). In those instances in which two or more nets are attached to the same offset member, changing the spacial relationship between the safety net and the pallet rack requires that this operation be repeated two or more times. In short, adjustments, like installation, to existing pallet rack guard systems can be and often are very labor intensive.

SUMMARY OF THE INVENTION

According to the pallet rack safety system of this invention, a safety guard can be attached to any pallet rack member of the pallet rack. The safety system of the present invention does so with minimum of small attachment parts. The pallet rack member may be an upright support post, a horizontal support, an offset bar for horizontally extending the back of a pallet rack, or an extension boom for vertically extending the top of the pallet rack. The safety guard may include a tarpaulin, plastic webbing, a support system, a net, a combination net and support system, etc. The support system may include a support arm and/or a cable. The safety guard is adjustable and may be adjusted by using a slidable mounting sleeve in such a manner so that all of the guard members, such as the net and cables, are in the same plane and that the spacial distance between the safety guard and the back of the pallet rack can be adjusted without disengaging the safety guard from the offset member.

The slidable mounting sleeve is universally used horizontally for offset and vertically for height adjustment and to receive the diagonal support arm.

The pallet rack safety system may include an offset bracket assembly which includes an offset bar, a mounting plate, and a mounting sleeve. (Offset bar has a fixed length and it has a first end and second end.) The mounting plate is attached to the first end of the offset bar and adapted to securely engage an upright support post of the pallet rack.

The mounting plate is attached to the offset bar in a manner such that its plane is perpendicular to the central axis of the offset bar. The mounting sleeve is of a fixed length and is adapted to be slidably received on the offset bar. It has at least one hole that can be aligned with at least one aperture of the offset bar. The sleeve also has at least one eyelet securely attached to an external surface and configured to engage the safety guard. The offset bracket assembly of this invention may be mounted to the support post of the pallet rack through the use of U-bolts or other fasteners. The mounting sleeve may be securely attached to the offset bar through the use of any standard pin such as a bolt or locking pin which is inserted through the hole end into the aperture of the offset bar.

In one embodiment of the invention, the offset bar is a square steel tube with at least one set of opposing sides having at least one set of aligned, equidistantly spaced perforated apertures along its linear length. In this embodiment, the mounting sleeve is also of a square steel tube construction but sized such that it is slidably receivable over the offset bar. The sleeve has sets of holes which correspond to the offset bar's apertures. Welded to at least one side of the mounting sleeve is an eyelet designed to engage the safety guard and preferably, two or more of the external sides of the mounting sleeve contain such an eyelet with all the eyelets in the same plane.

Another embodiment of the mounting sleeve is a universal sleeve and has three eyelets in the same plane and similarly aligned with a 4th eyelet perpendicular and in a different plane. This universal mounting sleeve can be used on horizontal offset bars and on vertical extension booms.

In another embodiment of this invention, the pallet rack guard system includes pallet rack members such as vertical extension booms and diagonal supports that allow the safety guard to be extended above the top shelf of the rack.

Accordingly, it is the general object of the present invention to provide a safety system which allows for greater safety, has fewer parts, and is easier to install and adjust.

Various other features, objects, and advantages of the present invention and the manner in which they are achieved will be made apparent from the following detailed description, drawings and claims.

BRIEF DESCRIPTION OF THE DRAWINGS

FIGS. 7–9 are enlarged side views, respectively, of different flush mount embodiments with and without an offset bar.

FIG. 10 is an enlarged side view of a universal mounting sleeve.

DETAILED DESCRIPTION OF THE PREFERRED EMBODIMENT

Figure 1:
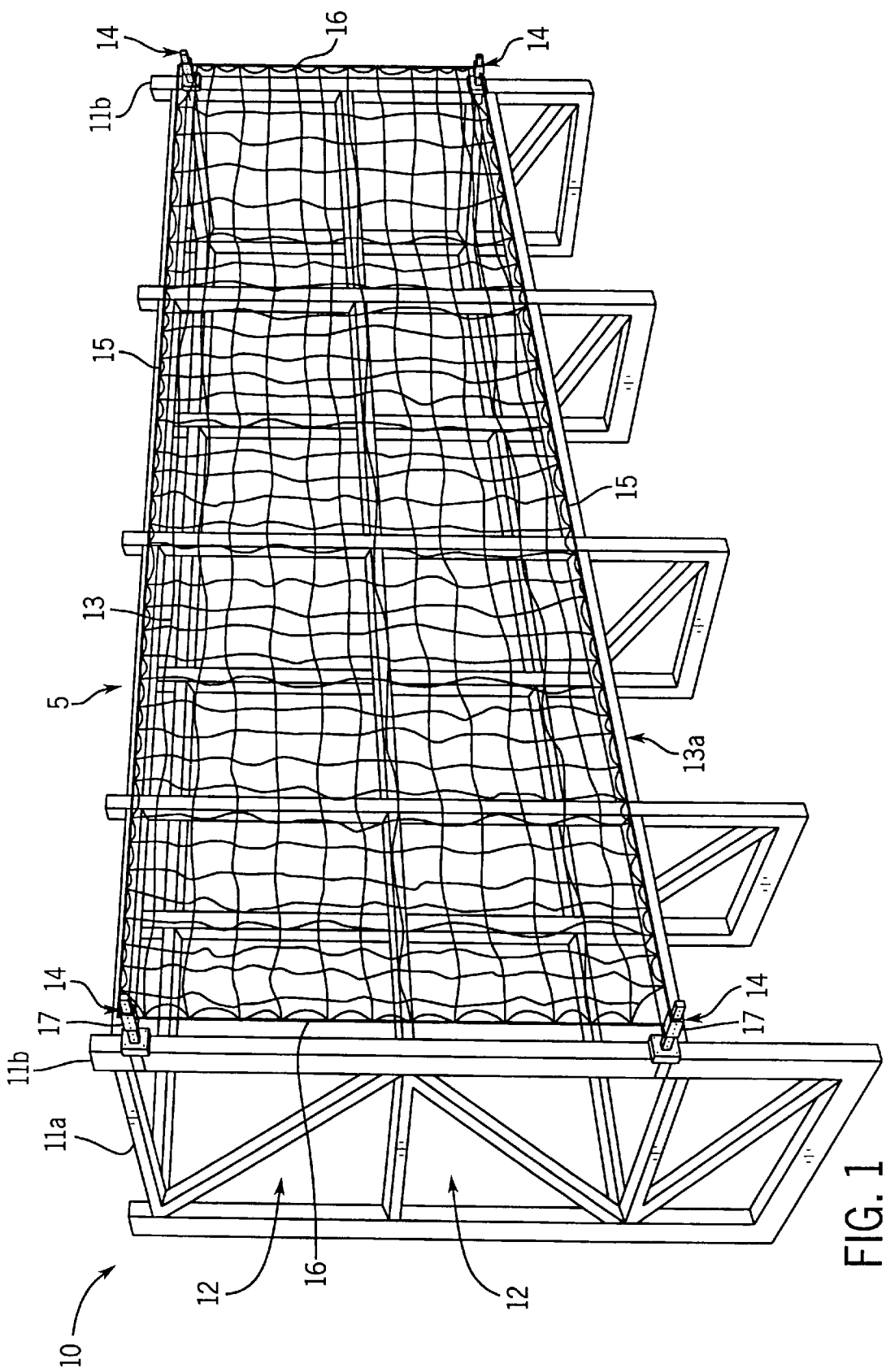
FIG. 1 is a perspective view of a safety system for pallet rack with a safety net attached in an offset relationship.

With reference to the drawings wherein like numerals represent like parts throughout the figures, FIGS. 1–4 show a safety system 5 for a pallet rack 10. As best shown in FIG. 1, a conventional pallet rack 10 is made up of a plurality of pallet rack members which include horizontal supports 11a and vertical upright support posts 11b and define one side or face (here a backside) of the pallet rack 10. Pallet racks, as well as other storage and similar constructions, are available in various heights and lengths, and can comprise any number of storage cells 12 in the horizontal as well as in the vertical direction.

The pallet rack 10 is equipped with a safety guard 13a which, as shown in the embodiment in FIG. 1, may include a safety net 13 and horizontal and vertical cables 15, 16. The cables 15, 16 give the net support and added strength. The safety net 13 may be positioned in an offset relationship to the rack itself as shown. The offset relationship is desirable because many, if not most, pallets will extend off the backside of the pallet rack 10. Sometimes the contents of the pallets also extend off the pallet rack 10.

Figure 2:
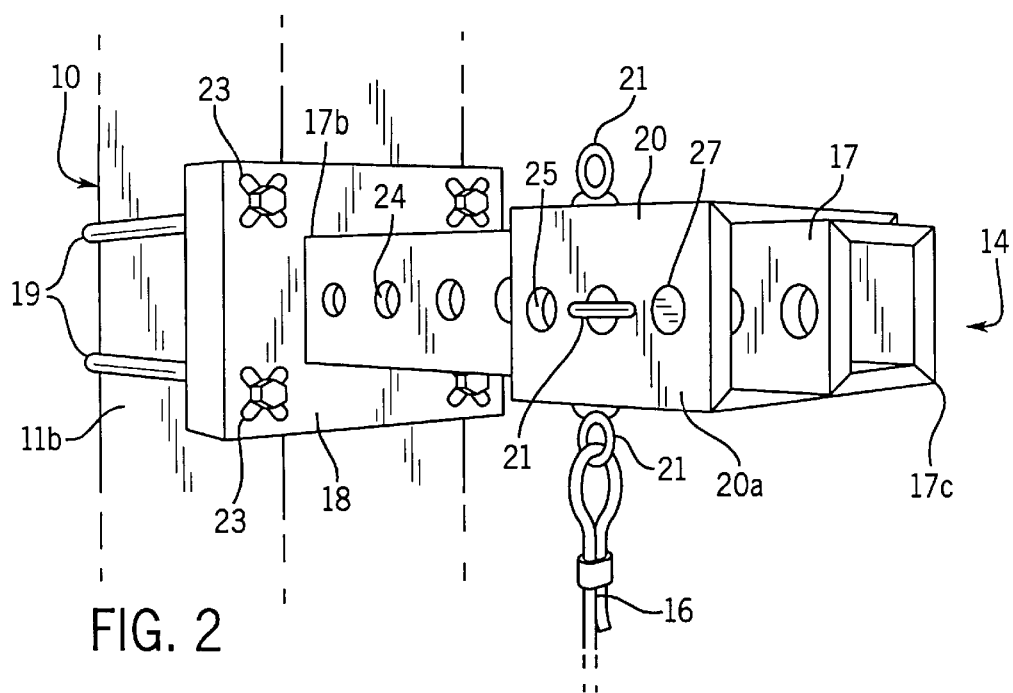
FIG. 2 is an enlarged perspective view of one embodiment of an offset bracket assembly.
Figure 4:
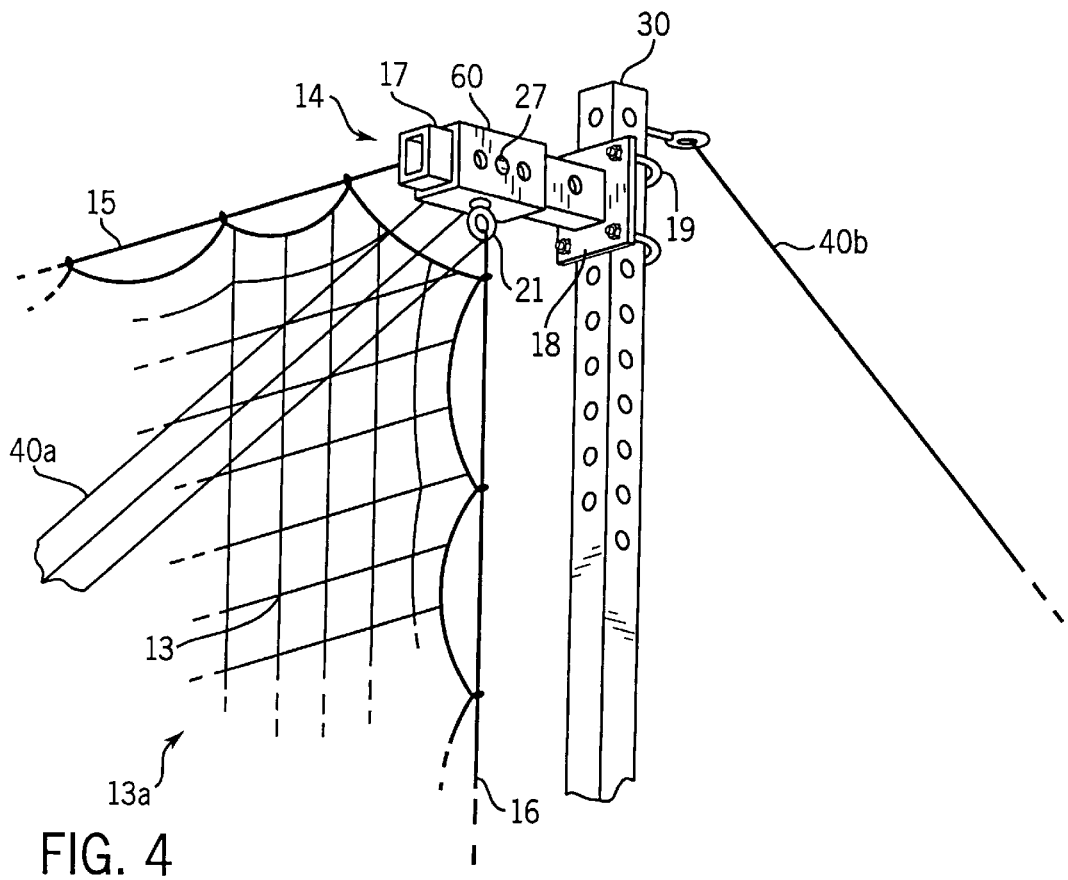
FIG. 4 is a perspective view of an extension boom, a universal mounting sleeve supporting a horizontal net supporting cable, a vertical net supporting cable, and a diagonal support arm.
Figure 5:
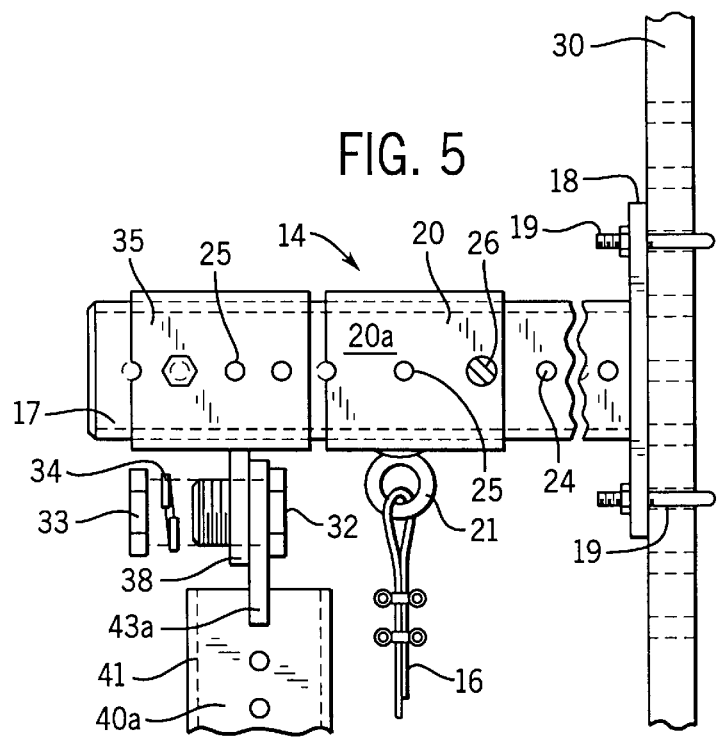
FIG. 5 is a side view of an offset bracket assembly and a separate attachment sleeve for one embodiment of a safety system which includes a support system for an extension boom.

Various embodiments of the offset bracket assemblies 14, horizontal netsupporting cables 15, and vertical netsupporting cables 16 are depicted in FIGS. 2, 4, and 5. An offset bracket assembly 14 is comprised of an offset bar 17 which may be attached to a vertical support post 11b by a mounting plate 18 and U-bolts 19 as best shown in FIG. 2. Mounting sleeve 20 is slidably received on offset bar 17, and has an external surface 20a with attached eyelets 21. The horizontal and vertical net-supporting cables 15, 16 are supported by eyelets 21 (best shown in FIG. 4). Mounting sleeve 20 is securely attached in place on offset bar 17 by means of locking pin 27. A mounting sleeve 20 may also be slidably received on other pallet rack members such as supports 11a or posts 11b (not shown). Sleeves 35, 45, and 60 may alternately be used as described for a specific user's preferences.

Figure 3A:
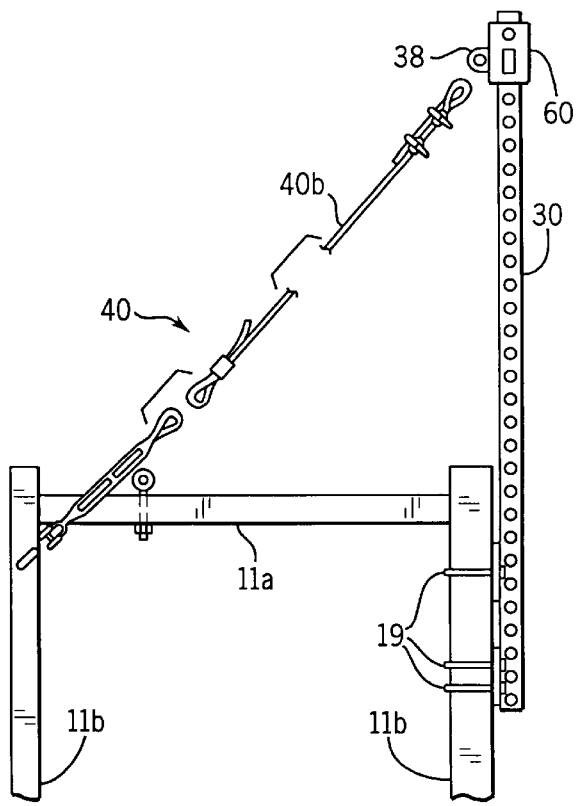
FIGS. 3A and 3B are a side view and an end view, respectively, of a safety system which includes a universal mounting sleeve.
Figure 3B:
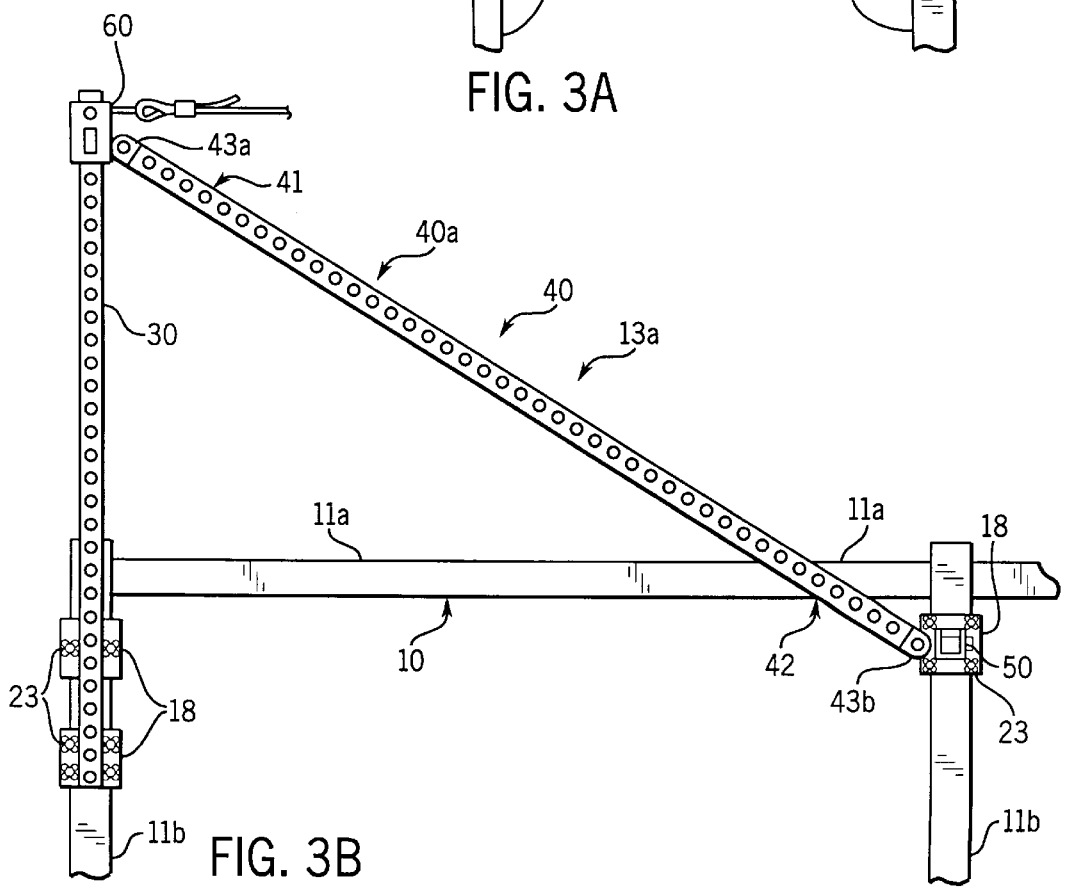

In another embodiment as best shown in FIGS. 3A and 3B, the safety guard 13a may also include a support system 40 which is preferably an extension boom 30, a steel support arm 40a and a steel support cable 40b, and a universal mounting sleeve 60. The support arm 40a has a first end 41 attached to an eyelet 38 (not shown) and a second end 42 attached to the pallet rack 10 by use of mounting plate 18. Similarly, support cable 40b is attached to an eyelet 38 with its opposite end attached to the rack by conventional means. The support system 40 serves to support the extension boom 30 and the safety guard 13a. When the guard 13a is projected above the top of the rack, the support system 40 and guard 13a serve to prevent pallets or goods from falling from the top of the pallet rack 10.

Figure 6:
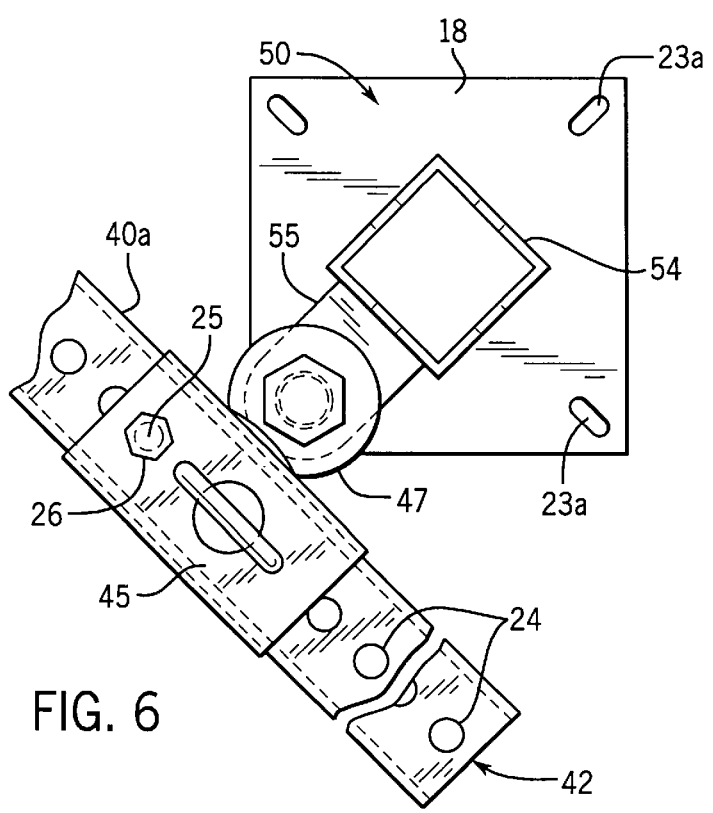
FIG. 6 is an enlarged view of a diagonal support arm and an attachment sleeve using a 45° flush mount.

In another embodiment as best illustrated in FIGS. 5 and 6, an upper attachment sleeve 35 may receive an upper end 41 of the support arm 40a and lower attachment sleeve 45 may slidably receive lower end 42 of the support arm 40a. Attachment sleeves 35, 45 may allow for adjustably attaching at least one end 41, 42 of support arm 40a to pallet rack 10. For example as shown in FIG. 6, when the support needs a length adjustment, pin (which may be a locking bolt 26, a locking pin or the like) is removed from hole 25 in the lower attachment sleeve 45 and aperture 24 in the support arm 40a. The lower end 42 of the support arm 40a may then slide through the sleeve 45 until the desired length is reached, as is necessary for different size racks or different height adjustment of the guard 13a. The bolt 26 is then reinserted into the hole 25 and aperture 24 to lock the support arm 40a in place. It can be seen that universal mounting sleeve 60, can be substituted for upper attachment sleeve 35 and mounting sleeve 20.

As shown in the embodiments shown in FIGS. 2–3B, extension boom 30 and offset bar 17 may be attached to the pallet rack 10 by at least one mounting plate 18 having X-shaped openings 23. At least one mounting plate 18 having X-shaped openings may also be used to attach a flush mount 50 to vertical support post 11b of pallet rack 10. The support arm 40a may be attached directly to the flush mount 50 at a second connection eyelet 43b as shown in FIG. 3B. However, in another embodiment the lower attachment sleeve 45 which slidably receives the support arm 40a may be attached by eyelet 47 to eyelet 55 of flush mount 50 as shown in FIG. 6. As shown in the various embodiments in FIGS. 7–9, the flush mount 50 may also be an anchoring bolt 52, an offset bar 54, or a combination offset bar and anchoring bolt. The flush mount 50, as shown in FIG. 9, may be also slidably adjustable by fitting over the end of flush mount 50 FIG. 8 or the end of an offset bar. The flush mount 50 that includes offset bar 54 may have its axis set at a 45 degree angle as shown in FIG. 6.

FIG. 5 shows a side perspective of one embodiment of offset bracket assembly 14 in combination with an upper attachment sleeve 35 mounted on an extension boom 30. This upper sleeve 35 allows support arm 40a to be adjustably attached to the pallet rack 10. The offset bar 17 is securely attached to mounting plate 18 by any suitable means, e.g. welding, such that the plane of mounting plate 18 is perpendicular to the central axis of offset bar 17. Mounting plate 18 has four corner openings 23 that may be in the general shape of an X or cross that allow for easy adjustment of the mounting plate against extension boom 30 and to receive one of the threaded ends of a U-bolt 19. This X-shape or pattern allows for use of smaller U-bolts 19 (on some racks) as well as positioning the offset bar 17 on the face of the rack 10. In another embodiment, the X-pattern may be replaced by opposing diagonal slots 23a as shown in FIG. 6.

While the offset bar 17 can have any suitable configuration, e.g. cylindrical, rectangular, planer, etc., preferably it is a square steel tube of fixed length, e.g. 14 inches. The actual length of the offset bar 17 can vary to convenience. As shown in FIG. 2, the offset bar 17 has a first end 17b and a second end 17c. The first end 17b may be attached to a mounting plate 18. As illustrated in FIG. 2, at least one side of the offset bar 17 has aligned, spaced perforated apertures 24, and preferably these apertures are equidistantly spaced from one another. In a more preferred embodiment, at least one pair of opposing sides has these apertures 24 in alignment with one another (both along the linear length of each side and across from one another). In a still more preferred embodiment, both sets of opposing sides of the mounting sleeve 20 have such aligned holes 25. If the shape of the offset bar 17 is cylindrical, then these four sets of apertures 24 in the bar 17 and holes 25 in the mounting sleeve 20 are aligned.

Mounting sleeve 20 is better seen in FIG. 5 and as depicted here, this sleeve takes the general configuration of the offset bar 17 (here a steel tube sized such that it slidably fits over the external surface of the offset bar). Preferably, the material of construction for this sleeve 20 is the same as that for the offset bar 17 and mounting plate 18, i.e. steel, and to each external surface 20a of the sleeve is securely attached, e.g. by welding, an eyelet 21 to which a net-supporting cable 16 can be attached. The eyelets 21 may be arranged on each surface 20a of the sleeve 20 such that all are in the same plane and that plane is parallel to the plane of the offset bar 17 (as shown in FIG. 2). As mentioned, mounting sleeve 20 also contains pairs of aligned holes 25 on opposing surfaces, and these holes 25 are designed to receive locking bolt 26 as best seen in FIG. 5. In operation, the holes 25 are aligned with a pair of aligned, opposing apertures 24 on the offset bar 17 and then the mounting sleeve 20 is positioned and secured in place by either the locking pin 27 or bolt 26 which is fitted through all four aligned holes 25 and apertures 24 and fastened in place with either a nut (not shown) in the case of a locking bolt 26 or a cotter pin (not shown) or other similar device in the case of the locking pin 27.

In addition to having a mounting sleeve 20, offset bar 17 can also be equipped with an upper support attachment sleeve 35 as illustrated in FIG. 5. Upper attachment sleeve 35 is of the same general design as mounting sleeve 20, and it is attached to offset bar 17 in the same manner as mounting sleeve 20. However, upper attachment sleeve 35 allows support arm 40a to be adjustably attached to the offset bar 17. The support arm 40a is attached at first end 41 through first connection eyelet 43a to the upper attachment sleeve 35 by means of bolt 32, nut 33, and washer 34. Thus, when the attachment 35 sleeve moves, so does the attached support arm 40a.

In one embodiment best shown in FIG. 10, mounting sleeve 20 and attachment sleeve 35 can form one integral piece or universal sleeve 60. FIGS. 3A and 3B depict a universal sleeve 60 in use on a boom 30. In this embodiment, the sleeve 60 is equipped with eyelet 38 (in addition to the eyelets 21) to which diagonal support arm 40a may be attached to the sleeve 60 through first connection eyelet 43a by means of a bolt, nut, and washer (not shown). Similarly, second connection eyelet 43b may be attached to flush mount 50 by means of a bolt, nut, and washer (not shown). First and second connection eyelets 43a, 43b may be securely attached to diagonal support arm 40a by any suitable means, e.g. welding, and the diagonal support arm 40a can be positioned at any angle to the plane of the surface of the sleeve 60 to which it is attached, i.e. the diagonal support arm 40a can be in a plane parallel with the surface of the sleeve 60 to which it is attached or in any angle up to perpendicular to it. It can be observed that the support arm 40a could alternatively be equipped without one or both eyelet(s) 43a and 43b by substituting sliding sleeves 45 and a different mounting bracket such as shown in FIG. 6 for example.

FIG. 4 shows a universal mounting sleeve 60 with safety guard 13a and the offset bracket assembly 14 of this invention. In this embodiment, the safety guard 13a is a steel support arm 40a, horizontal and vertical cables 15, 16, and a net 13. As mentioned earlier, the guard 13a may also include, for example, plastic webbing, metal sheeting, a tarpaulin, etc. Once attached, the offset distance between the safety guard 13a and pallet rack 10 can be varied by simply removing pin 27 from the universal mounting sleeve 60 and offset bar 17, repositioning the sleeve 60 on the offset bar 17, and then reinserting the pin 27. Similarly, if a guard 13a were attached to universal mounting sleeve 60 as shown in FIG. 3B, the guard could be raised or lowered simply by removing a pin (not shown) and sliding the sleeve up or down the extension boom 30. Support bar 40a in this case could adjust to various angles by sliding the flush mount plate up or down when equipped with eyelets (43b) or by sliding through an attachment sleeve 45 as shown in FIG. 6.

In summary the various embodiments of this invention include (i) a sliding, adjustable mounting sleeve 20 on a horizontal offset bar 17 for adjustably attaching safety guard 13a, (ii) a sliding, adjustable sleeve 20 that is secured in place with a single drop-in pin 27 or simple bolt 26 (although more than one pin or bolt can be used if desired), (iii) a vertical member comprising a fixed length extension boom 30 with a slidable, light weight universal mounting sleeve 60 for adjusting the top of the safety guard 13a and a support system 40 and which can also receive offset assemblies 14, and (iv) an adjustable support system 40 for the boom 30 comprises a fixed length support arm 40a attached at one end 41 to a slidable upper support attachment sleeve 35 and its other end 42 attached to a lower support attachment sleeve 45 and flush mount 50, and (v) a universal mounting sleeve 60 that combines the mounting sleeve and attachment sleeves into a single sleeve which may function to secure a safety guard 13a which includes a support arm 40a, a net 13, and cables 15, 16.

Although the invention has been described in considerable detail through the preceding embodiments, this detail is for the purpose of illustration. Many variations and modifications can be made by one skilled in the art without departing from the spirit and scope of the invention as described in the following claims.

What is claimed is:

1. A safety system for a pallet rack comprising:

a plurality of rigidly connected pallet rack members;

a plurality of sleeves each slidably attached to at least one pallet rack member, each sleeve having at least one integrally affixed eyelet; each pallet rack member having a mounting plate having X-shaped openings for adjustable attachment to said pallet rack; and a safety guard attached to the eyelets for safely retaining loaded pallets on the pallet rack.

2. The safety system of claim 1 wherein at least one pallet rack member is an extension boom for vertically extending the pallet rack, and wherein the sleeve is a universal mounting sleeve which may receive both the safety guard and a support arm.

3. The safety system of claim 1 wherein at least one pallet rack member is an offset bar for horizontally extending the pallet rack and wherein the offset bar is capable of receiving more than one sleeve.

4. The safety system of claim 3, wherein spacial distances between the safety guard and the pallet rack can be adjusted without disengaging the safety guard from the offset bar.

5. The safety system of claim 3 wherein the safety guard includes a pallet support arm having a first end attached to an eyelet and a second end attached to the pallet rack.

6. The safety system of claim 5 wherein the safety guard includes a net and a plurality of cables acting in cooperation with the net to support pallets.

7. The safety system of claim 6, wherein the cables are retained in the same plane.

8. The safety system of claim 6, further comprising an offset bar attached to the extension boom.

9. The safety system of claim 8, further comprising an attachment sleeve slidably receivable on the support arm for adjustably attaching at least one end of the support arm to the pallet rack.

10. The safety system of claim 9, further comprising a locking pin removably received by any one of four apertures in at least one pallet rack member for securing the sleeve to the member.

11. A safety system for a pallet rack comprising:

an extension boom for vertically extending the pallet rack;

an offset bar for horizontally extending the pallet rack connected to ssaid extension boom by a mounting plate having X-shaped openings for adjustable attachment to said extension boom;

a mounting sleeve slidably received by the offset bar, the mounting sleeve having at least one hole and an external surface with at least one permanently affixed eyelet; and a safety guard attached to at least one eyelet wherein said safety guard is movable without detachment from the mounting sleeve.

12. The safety system of claim 11, wherein the safety guard further comprises a support arm having a first end and a second end, the first end adjustable attached to the extension boom, the second end attached to the pallet rack.

13. The safety system of claim 12, further comprising an attachment sleeve slidably received by the support arm for adjustably attaching at least one end of the support arm to the pallet rack.

14. The safety system of claim 13, further comprising a pin removably received by an aperture in the offset bar and the hole for securing the mounting sleeve.

15. The safety system of claim 13, further comprising a flush mount for connecting the pallet rack to the attachment sleeve.

16. The safety system of claim 15 wherein the flush mount is an offset bar that has an axis at a 45 degree angle.

17. The safety system of claim 15 wherein the flush mount comprises an anchoring bolt.

18. The safety system of claim 15 wherein the flush mount is adjustably attached to an offset bar.

19. The safety system of claim 18, wherein the support arm has a first connection eyelet at the first end and a second connection eyelet at the second end, the first connection eyelet connected to the mounting sleeve, and the second connection eyelet connected to the flush mount.

20. An offset bracket assembly for a pallet rack comprising:

an offset bar of a linear length and having a first end and a second end, the bar having at least one set of apertures positioned along its length;

a mounting plate attached to the first end of the offset bar and adapted with X-shaped openings to adjustably engage an upright support post of the pallet rack without interfering with pallets contained thereon, the mounting plate attached to the offset bar in a manner such that its plane is perpendicular to the central axis of the offset bar;

at least one sleeve of a fixed length and adapted to be slidably received by the offset bar, the sleeve having at least one hole that can be aligned with at least one aperture of the offset bar and having at least one eyelet securely attached to an external surface; and a plurality of cables directly connected to at least one eyelet in the same plane so that spacial distances between the cables and the pallet rack can be slidably adjusted without disengaging the cables from the offset bar.

21. The safety system of claim 20, wherein a plurality of eyelets are securely attached to the surface of the sleeve by welding.

* * * * *